US008153222B2

(12) United States Patent
Plummer

(10) Patent No.: US 8,153,222 B2
(45) Date of Patent: Apr. 10, 2012

(54) SELF-LAMINATING JEWELRY TAG

(76) Inventor: Sean A. Plummer, Gilbert, AZ (US)

( * ) Notice: Subject to any disclaimer, the term of this patent is extended or adjusted under 35 U.S.C. 154(b) by 0 days.

(21) Appl. No.: 12/870,805

(22) Filed: Aug. 28, 2010

(65) Prior Publication Data

US 2011/0039052 A1 Feb. 17, 2011

Related U.S. Application Data

(63) Continuation of application No. 11/187,103, filed on Jul. 23, 2005, now Pat. No. 7,794,809.

(60) Provisional application No. 60/590,449, filed on Jul. 24, 2004.

(51) Int. Cl.
*B32B 9/00* (2006.01)
*B32B 33/00* (2006.01)

(52) U.S. Cl. .................. 428/40.1; 428/42.1; 40/299.01; 40/665; 40/672

(58) Field of Classification Search ................. 428/40.1, 428/42.1, 42.2, 42.3, 43; 283/72, 79, 81; 40/299.01, 665, 672
See application file for complete search history.

(56) References Cited

U.S. PATENT DOCUMENTS

| | | | | |
|---|---|---|---|---|
| 3,197,899 | A * | 8/1965 | Twentier | 40/633 |
| 4,865,352 | A * | 9/1989 | Gollon | 283/79 |
| 7,222,448 | B2 * | 5/2007 | Riley | 40/633 |

* cited by examiner

*Primary Examiner* — Patricia Nordmeyer
(74) *Attorney, Agent, or Firm* — Law Office of Glenn R. Smith; Glenn R. Smith; Lisa L. Smith

(57) ABSTRACT

A self-laminating jewelry tag has a clear flap which folds over a printable side of a label so that the clear flap and adhesive on the clear flap substantially cover and adhere to the label printable side, thereby laminating the printable side so as to protect printing on the printable side from wear, cleaning or other processes that tend to render the printing illegible.

7 Claims, 10 Drawing Sheets

SELF-LAMINATING JEWELRY TAG

CROSS-REFERENCE TO RELATED APPLICATIONS

This application is a continuation of U.S. patent application Ser. No. 11/187,103, filed Jul. 23, 2005, titled Jewelry Tag Substrate, scheduled to issue Sep. 14, 2010 as U.S. Pat. No. 7,794,809; which relates to and claims the benefit of prior U.S. Provisional Application No. 60/590,449 entitled Self Laminating Jewelry Tag, filed Jul. 24, 2004. All of the aforementioned prior patents, patent applications and provisional patent applications are hereby incorporated by reference herein.

BACKGROUND OF THE INVENTION

Jewelry tags are commonly used to label eyeglasses, rings, earrings, bracelets, watches and other jewelry with, for example, price, description, product number and/or bar code information. Jewelry tags come in a variety of shapes and sizes. Tags are typically labeled using direct thermal or thermal transfer printers. Direct thermal printers use a print head composed of a row of closely spaced and individually controlled heating elements and rely on a print medium that changes color when heated above a threshold temperature. Thermal transfer printers use the same type of print head employed in direct thermal machines, but place a ribbon between the print head and the medium. Heat from the print head melts components of the ribbon, which transfer to the print medium.

SUMMARY OF THE INVENTION

The printing on jewelry tags often provides the only record of important information regarding individual pieces of jewelry. Jewelry is typically in inventory for months or years at a time. As a result, printing on conventional jewelry tags is often degraded or removed entirely due to ordinary wear. Further, there are currently no laser or inkjet printable jewelry tags on the market where the printing will not be degraded by an ultrasonic or steam cleaning process. These two cleaning processes are used repeatedly on jewelry items, forcing a retailer to use either a more expensive thermal transfer printing machine or to print new tags each time items are cleaned. Jewelers, however, typically possess laser or inkjet printers for conventional computer use and do not wish to invest in and learn the thermal transfer process.

Advantageously, a self-laminating jewelry tag provides a clear laminate that is configured to fold over the label or print area of a jewelry tag so as to protect the printed information from wear, cleaning or other processes that tend to render the printing illegible. The jewelry tag label can be adapted for ink jet, laser or thermal printing.

Conventional jewelry tags also detract from the appearance of jewelry on display. Retailers go to considerable effort to hide tag labels in display cases. The portion of the tag that attaches to the jewelry, however, is difficult to cover-up. Advantageously, one embodiment of a clear jewelry tag has a clear shank that reduces tag visibility. In another embodiment, the entire jewelry tag is clear, obviating the need to hide tags, but allowing labels to be read when placed over an opaque background.

An aspect of a self-laminating jewelry tag is a clear flap which folds over a printable side of a label so that the clear flap and adhesive on the clear flap substantially cover and adhere to the label printable side, thereby laminating the printable side so as to protect printing on the printable side from wear, cleaning or other processes that tend to render the printing illegible. The self-laminating jewelry tag comprises a label having a printable side and an adhesive side. A substantially clear flap extends from the label. The flap has an adhesive side and a non-adhesive side. Adhesive on the adhesive side substantially covers the adhesive side. The flap is foldable over the label so that the flap adhesive side contacts and adheres to the label printable side. In this manner, the flap laminates the label so as to protect printing on the printable side.

In an embodiment, the jewelry tag has a first section and a second section comprising the label. The flap extends from at least one of the sections. The sections are foldable together so that the label printable side forms opposite facing print surfaces. The flap is foldable over at least one of the sections so as to laminate at least one of the sections. In another embodiment, a flap fold line separates the flap from the label, allowing the flap to fold along the flap fold line and onto the label printable side. In a further embodiment, an elongated shank extends from at least one of the sections. The shank is bendable in a loop with the shank passing through jewelry and terminating at the folded sections so as to secure the label to jewelry.

In various other embodiments, the jewelry tag according to claim 4 further has a first flap portion and a second flap portion comprising the flap. The first flap portion extends from the first section and the second flap portion extends from the second section. The sections are attachable together in a clamshell fashion. A first flap fold line defines the first flap portion. A second flap fold line defines the second flap portion. The first flap portion is foldable along the first flap fold line so as to laminate the second section. The second flap portion is foldable along the second flap fold line so as to laminate the first section. The shank extends between the first section and the second section. The first flap portion extends from the first section in a first direction generally perpendicular to the elongated shank. The second flap portion extends from the second section in a second direction generally perpendicular to the elongated shank and generally opposite the first direction.

DETAILED DESCRIPTION OF THE PREFERRED EMBODIMENTS

Jewelry Tags

Figure 1:
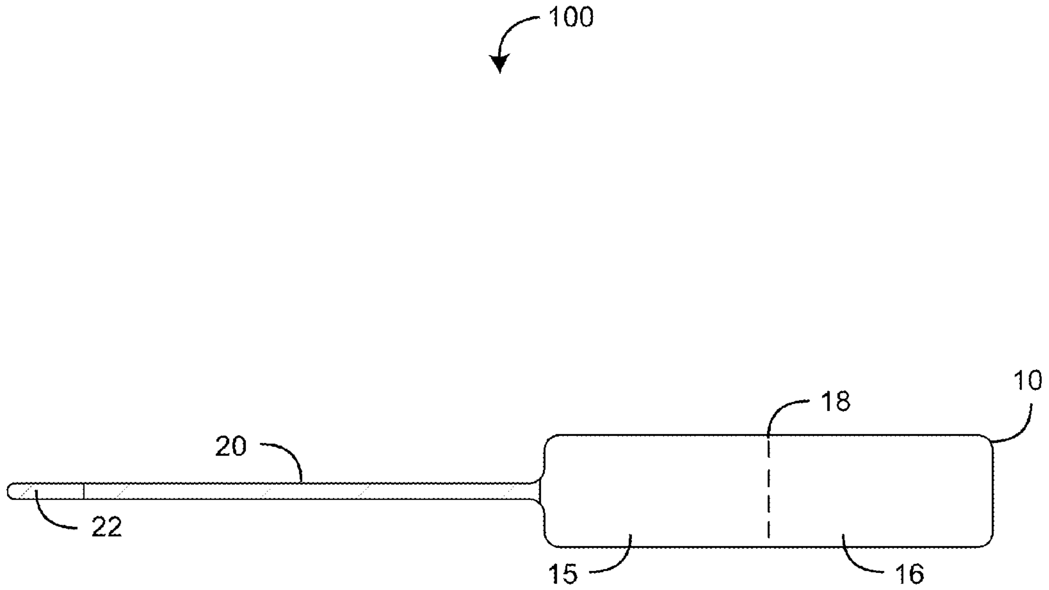
FIG. 1 is a plan view of a rat tail jewelry tag having a clear shank.

FIGS. 1-7 illustrate jewelry tag embodiments 100-600 having labels 10, 50 and shanks 20, 60. The labels 10, 50 are printable with information, such as data regarding a specific jewelry piece as described above. The shanks 20, 60 are adapted to attach the labels 10, 50 to an article, such as a jewelry piece. Advantageously, all or a portion of the jewelry tags 100-600 may be clear so as to reduce tag visibility when an article is in a display case, for example. Further, the jewelry tags 100-600 may advantageously have flaps 30, 70 adapted to laminate all or a portion of the labels 10, 50 so as to protect printed information thereon from wear or other deterioration. Rat tail jewelry tag embodiments 100-300 having these self-lamination and reduced visibility features are described with respect to FIGS. 1-3, below. Rat tail jewelry tag attachment and lamination are described with respect to FIGS. 4A-C. Barbell jewelry tag embodiments 500-600 having self-lamination and reduced visibility features are described with respect to FIGS. 5-6, below. Barbell jewelry tag attachment and lamination are described with respect to FIGS. 7A-D. A jewelry tag substrate 800 is described with respect to FIG. 8. Multiple, self-laminating and/or reduced visibility jewelry tags advantageously constructed on, and removable from, printable sheets 900 or printable rolls 1000 are described with respect to FIGS. 9-10, below.

Rat Tail Tags

FIGS. 1-4 illustrate rat tail jewelry tag embodiments 100-300 each having a foldable label 10 and a rat tail shank 20. In each embodiment, the foldable label 10 has a printable side 12 (FIG. 4A), an opposite adhesive side 14 (FIG. 4A), a first section 15 and a second section 16. The first and second sections 15, 16 are defined along a label fold line 18, which may be scored, perforated or otherwise delineated. For example, a top coat 840 (FIG. 8), which may be opaque, can be selectively excluded along a narrow strip so as to create a clear label fold line 18 delineated from an opaque background. The label 10 is folded along the label fold line 18 so that the first section 15 and second section 16 attach together along the adhesive side 14 (FIG. 4A), with the printable side 12 (FIG. 4A) forming opposite facing print surfaces 41, 42 (FIG. 4B). The rat tail shank 20 is configured to bend into a loop 25 (FIG. 4B) and fixedly adhere between the sections 15, 16. In this manner, the rat tail shank 20 is used to encircle or otherwise integrate with a portion of a jewelry piece, such as a ring, bracelet, watchband or necklace, or similar article so that the shank 20 secures the label 10 to the article.

Figure 2:
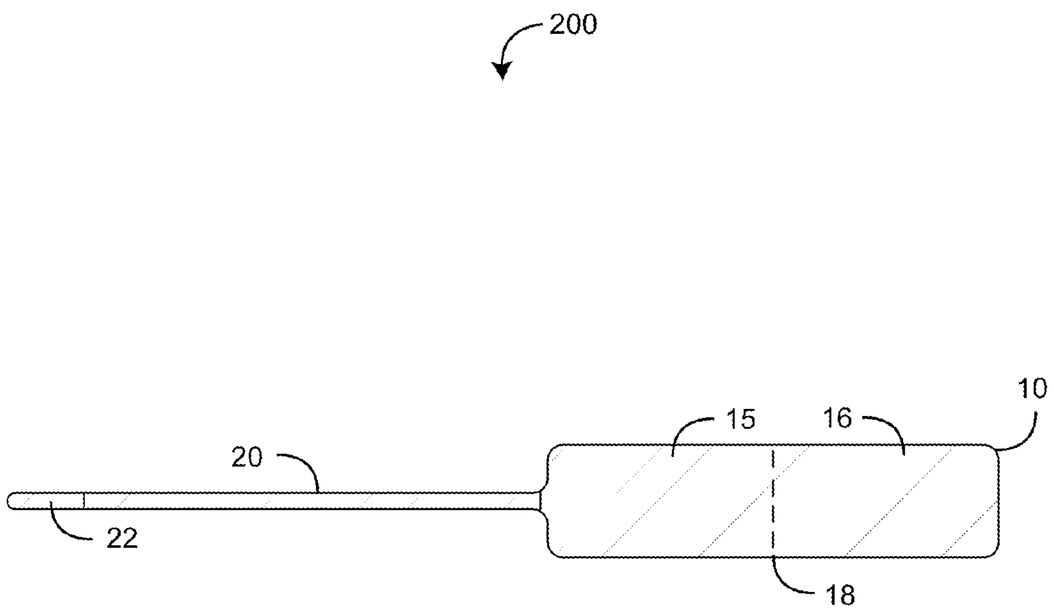
FIG. 2 is a plan view of a clear rat tail jewelry tag.

As shown in FIGS. 1-2, the label 10 extends generally inline with the rat tail shank 20. Further, the rat tail shank 20 and the second section 16 extend from opposite ends of the first section 15, and the label fold line 18 extends generally perpendicular to the shank 20 between the sections 15, 16. In a particular embodiment, the rat tail shank 20 is adhesive free except at the shank tip 22. As shown in FIG. 1, one jewelry tag embodiment 100 has a label 10 that is opaque and a rat tail shank 20 that is clear. As such, printing on the label 10 is readily visible, but the shank 20 is not readily visible when attached to jewelry in a display case, for example.

As shown in FIG. 2, another jewelry tag embodiment 200 has a label 10 and a rat tail shank 20 that are both clear. Printing on the label 10 is visible if held over an opaque background. Otherwise, the entire tag 200 is not readily visible, such as when attached to jewelry in a display case.

Figure 3:
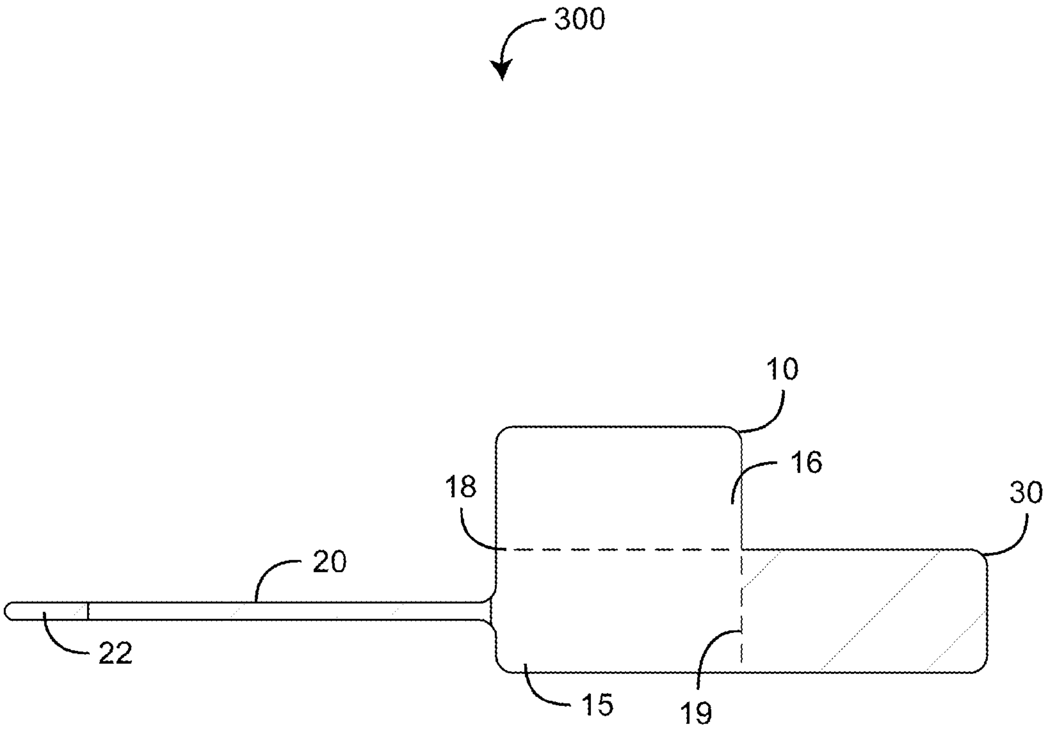
FIG. 3 is a plan view of a self-laminating rat tail jewelry tag.

FIG. 3 illustrates a self-laminating rat tail jewelry tag 300 having a label 10, a rat tail shank 20 and a label fold line 18 that defines sections 15, 16 of the label 10. The jewelry tag 300 further has a flap 30 defined along a flap fold line 19. Advantageously, the flap 30 is adapted to laminate a section of the label 10 and is substantially clear so that printed matter on the laminated label 10 may be read through the flap 30.

As shown in FIG. 3, the label 10 extends generally perpendicular to the rat tail shank 20, and the flap 30 extends generally inline with the rat tail shank 20. Further, the rat tail shank 20 and the flap 30 extend from opposite ends of a first section 15 and the flap fold line 19 defining the flap 30 extends generally perpendicular to the shank 20. Both the label fold line 18 and the flap fold line 19 may be scored, perforated or otherwise delineated as described above. A second section 16 extends from an edge of the first section 15, and the label fold line 18 extends generally parallel to the shank 20. The jewelry tag 300 is configured so that the label 10 folds first and the flap 30 folds over and laminates the second section 16, as described with respect to FIGS. 4A-C, immediately below.

Figure 4A:
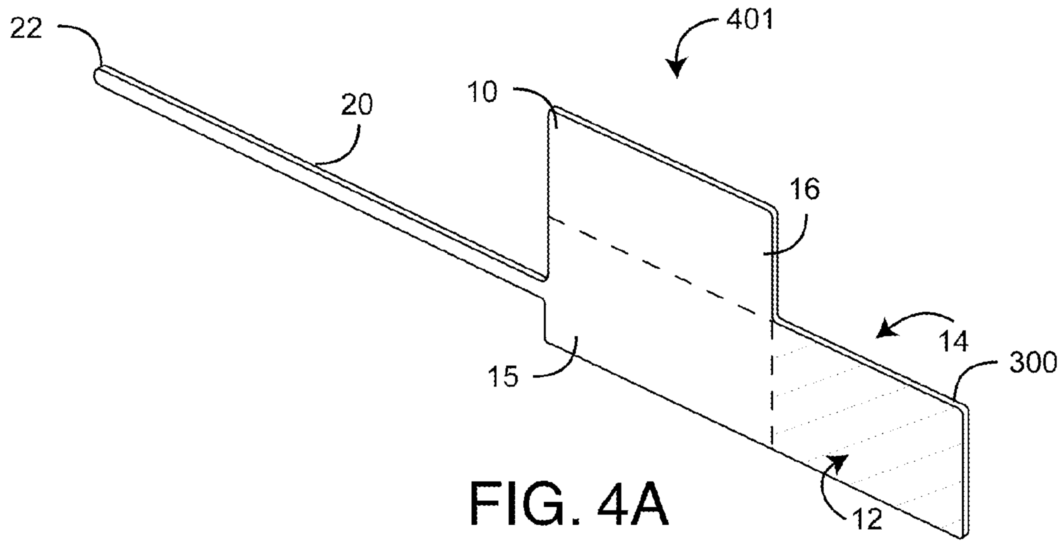
FIGS. 4A-C are perspective views of a self-laminating rat tail jewelry tag in unattached, attached and laminated positions, respectively.
Figure 4B:
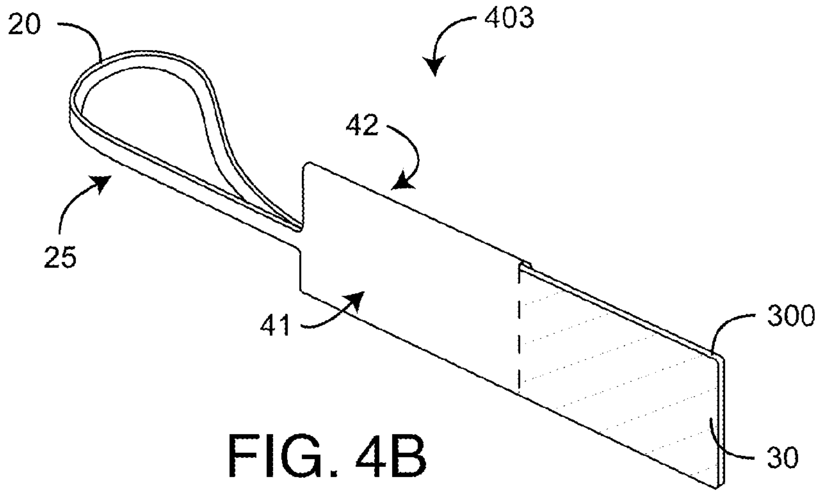
Figure 4C:
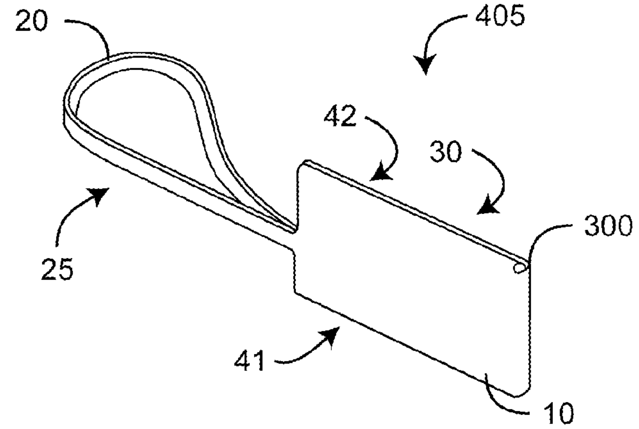

FIGS. 4A-C illustrate attachment of a rat tail jewelry tag 300, which has an unattached position 401 (FIG. 4A), an attached position 403 (FIG. 4B) and a laminated position 405 (FIG. 4C). As shown in FIG. 4A, a jewelry tag 300 is originally in an unattached position 401 such as after it is removed from a substrate 800 (FIG. 8) but before it is attached to an article, such as a jewelry piece or similar item. In the unattached position 401, the rat tail 20 is used to encircle a portion of an article.

As shown in FIG. 4B, the rat tail 20 is bent back on itself so that the tip 22 adheres to the adhesive side 14 of the label 10. Adhesive on the rat tail tip 22 facilitates maintaining the rat tail 20 in a loop 25 while folding the tag 300. Also shown in FIG. 4B, the second section 16 folds over the rat tail tip 22 and against the first section 15 along the adhesive side 14 so that the label 10 adheres to itself and to the rat tail 20. In this manner, the label sections 15, 16 fixedly secure the rat tail 20 in a loop 25 and the label 10 forms opposite facing print surfaces 41, 42.

As shown in FIG. 4C, the flap 30 folds over the second section 16, so that the adhesive side 14 of the flap 30 adheres to the print surface 42 of the second section 16. In this manner, the flap 30 laminates and protects the print surface 42 and allows any printed matter on the print surface 42 to be easily read through the flap 30.

A self-laminating rat tail jewelry tag is described above as having a flap that extends from an end of a first label section opposite a shank and that folds inline with the shank so as to laminate a second label section. In another embodiment, a flap extends from an edge of a first label section and folds perpendicularly to the shank so as to laminate a second label section. In yet another embodiment, a double-wide laminating flap extends from an edge of a first label section and folds twice so as to laminate a second label section and then the first label section, wrapping entirely around both sections.

Barbell Tags

Figure 5:
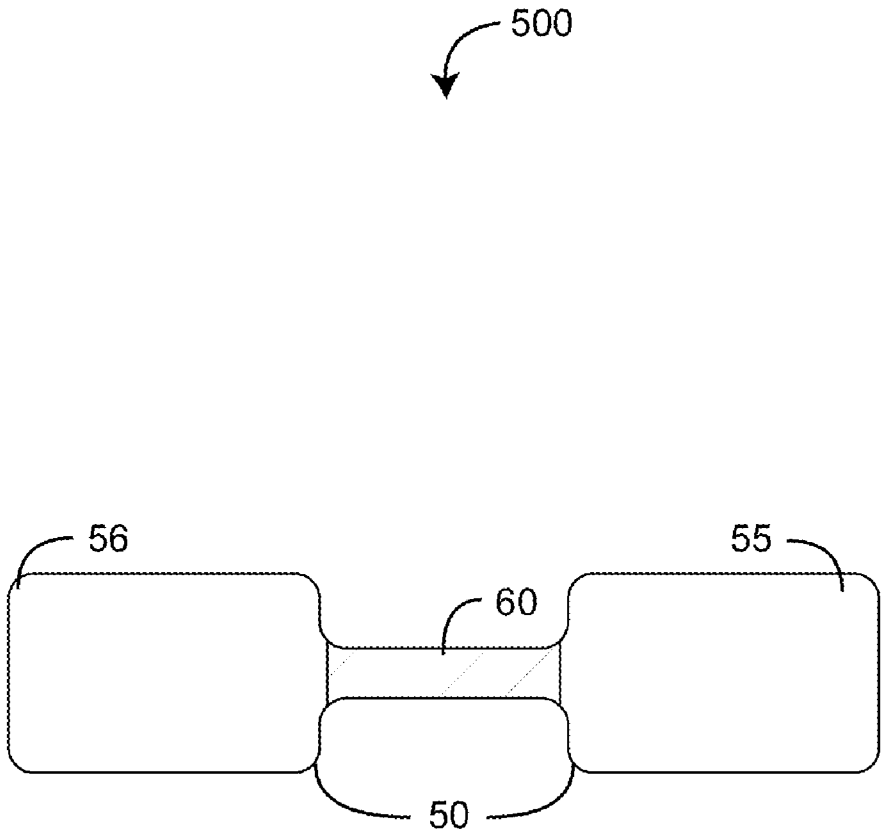
FIG. 5 is a plan view of a barbell jewelry tag having a clear shank.
Figure 6:
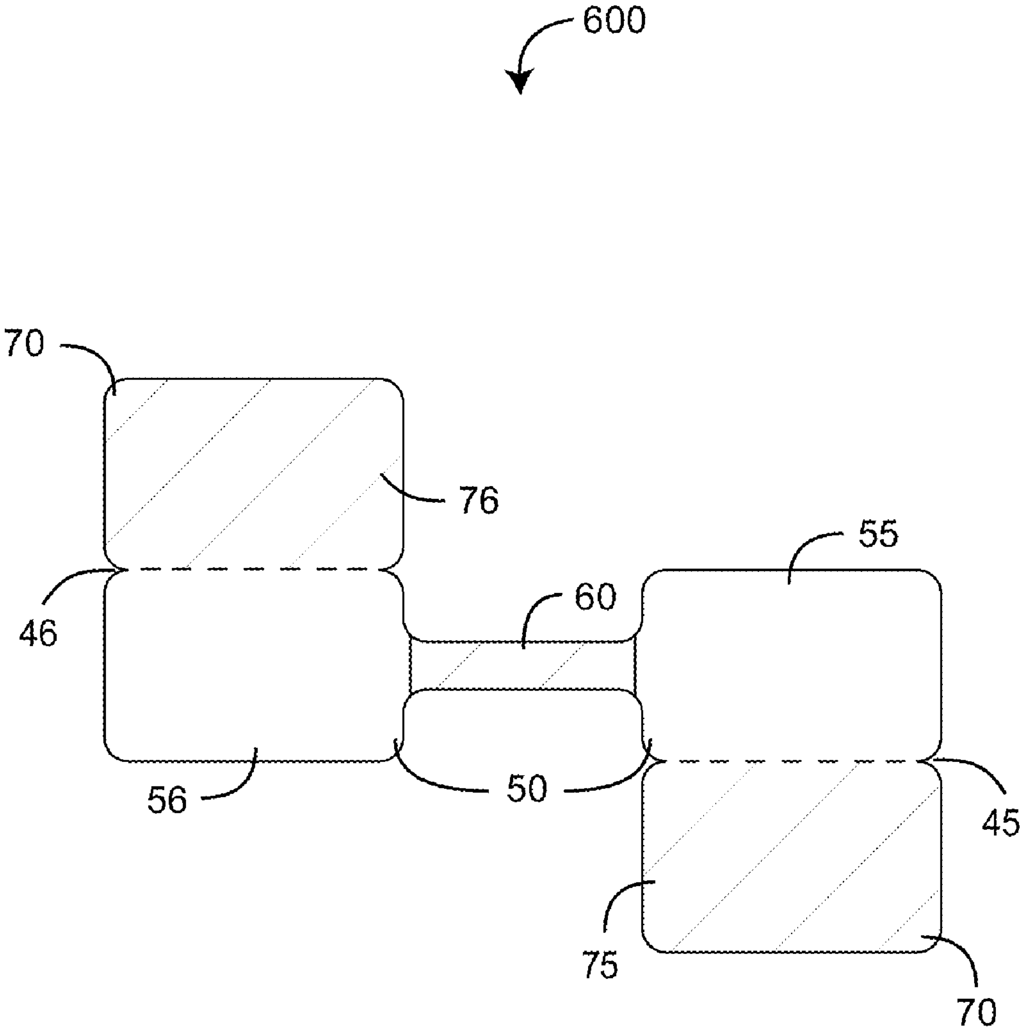
FIG. 6 is a plan view of a self-laminating barbell jewelry tag.

FIGS. 5-6 illustrate barbell jewelry tag embodiments 500-600 each having a joinable label 50 and a bar shank 60. In each embodiment, the joinable label 50 has a printable side 52 (FIG. 7A), an adhesive side 54 (FIG. 7A), a first section 55 and a second section 56. The first and second sections 55, 56 are disposed on opposite ends of, and connected by, the bar shank 60. The bar shank 60 is configured to bend into a loop 65 (FIG. 7B) so that the sections 55, 56 attach together clamshell fashion along the adhesive side 54 (FIG. 7A), with the printable side 52 forming opposite facing print surfaces 81, 82. In this manner, after the label 50 is printed, the bar shank 60 can be used to encircle or otherwise integrate with a portion of a jewelry piece or similar article so that the shank 60 secures the label 50 to the article.

As shown in FIG. 5, a barbell jewelry tag embodiment 500 has a label 50 that is opaque and a bar shank 60 that is clear. In this manner, printing on the label 50 is readily visible, but the bar shank 60 is not readily visible when attached to jewelry in a display case, for example. In a particular embodiment, the bar shank 60 is adhesive free.

As shown in FIG. 6 a self-laminating barbell jewelry tag 600 embodiment further has a flap 70 advantageously adapted to laminate the label 50. The flap 70 is substantially clear so that printed matter on the laminated label 50 may be read through the flap 70. In one embodiment, individual flaps 75, 76 extend from opposite edges of corresponding label sections 55, 56. In particular, a first flap 75 is defined by a first fold line 45 and extends from one edge of the first section 55 generally perpendicularly to the bar shank 60. A second flap 76 is defined by a second fold line 46 and extends from an opposite edge of the second section 56, also generally perpendicularly to the bar shank 60. The flap fold lines 45, 46 defining the flaps 75, 76 each extend generally parallel to the shank 60. The flap fold lines 45, 46 may be scored, perforated or otherwise delineated as described above. The sections 55, 56 are configured to attach together first. Then the flaps 75, 76 fold along the fold lines 45, 45 and laminate opposite sections 56, 55 of the label 50, as described with respect to FIGS. 7A-D, immediately below.

Figure 7A:
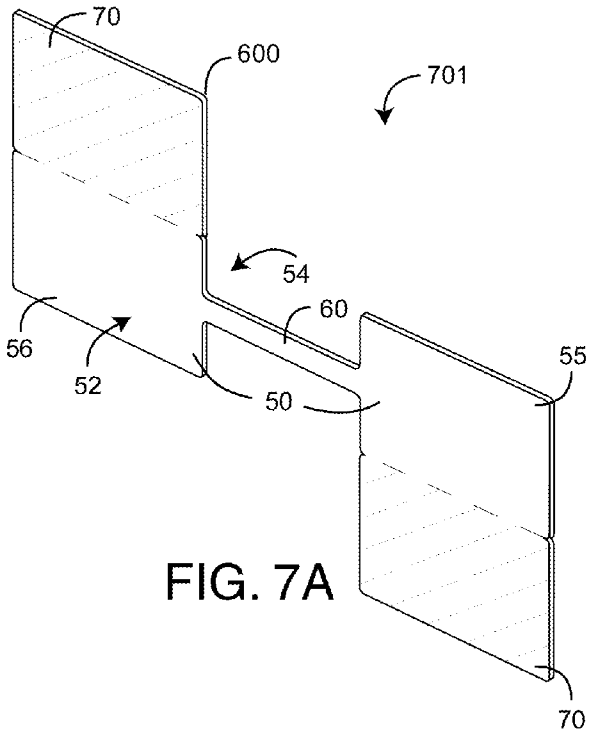
FIGS. 7A-D are perspective views of a self-laminating barbell jewelry tag in unattached, attached, partially laminated and fully-laminated positions, respectively.
Figure 7B:
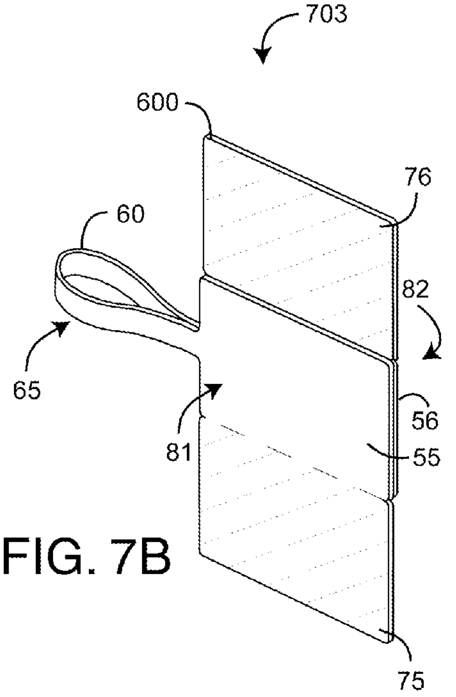
Figure 7C:
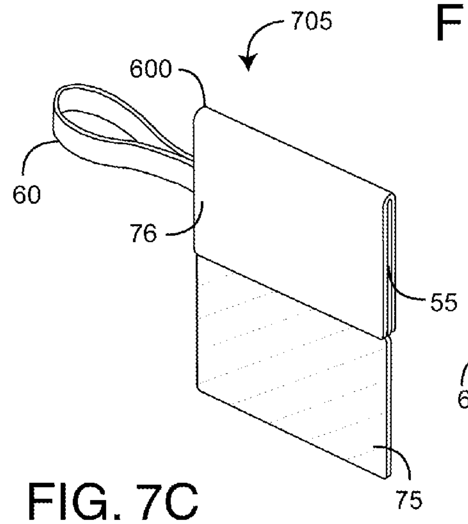
Figure 7D:
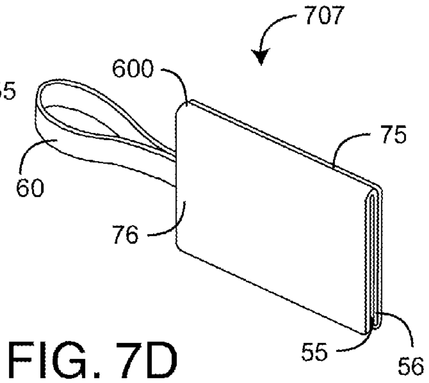
Figure 8:
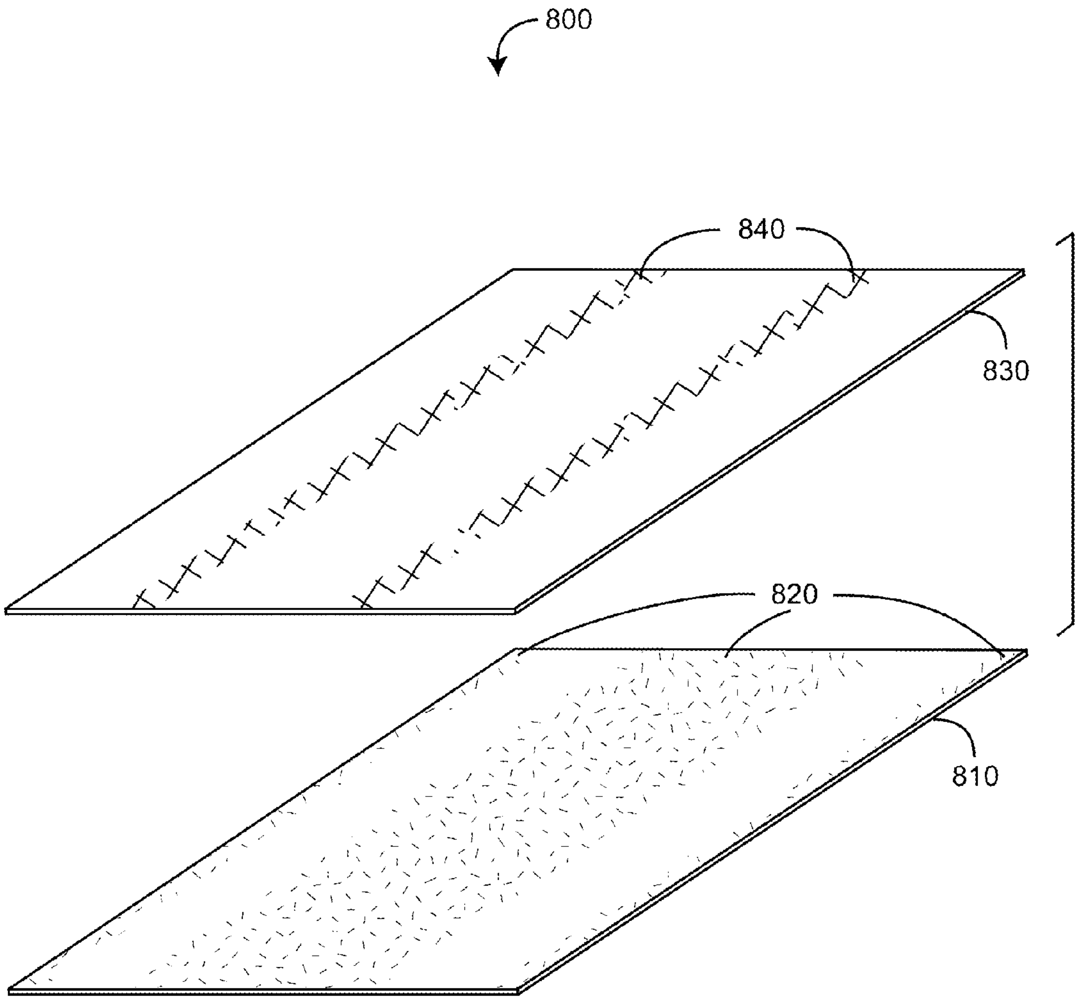
FIG. 8 is a perspective view of a jewelry tag substrate.

FIGS. 7A-D illustrate attachment of a self-laminating barbell jewelry tag 600, which has an unattached position 701 (FIG. 7A), an attached position 703 (FIG. 7B), a partially laminated position 705 (FIG. 7C) and a fully-laminated position 707 (FIG. 7D). As shown in FIG. 7A, a jewelry tag 600 is originally in an unattached position 701, such as after it is removed from a substrate 800 (FIG. 8). In the unattached position 701, the bar shank 60 is used to encircle a portion of jewelry or similar article.

As shown in FIG. 7B, the bar shank 60 is bent until label sections 55, 56 are aligned. The sections 55, 56 are then fixedly adhered together along the label adhesive side 54 so as to maintain the bar shank 60 in a loop 65 and configure the label 50 with opposite facing print surfaces 81, 82.

As shown in FIG. 7C, a second flap 76 folds over the first section 55 so that the adhesive side 54 of the second flap 76 adheres to the print surface 81 of the first section 55. As shown in FIG. 7D, a first flap 75 folds over the second section 56 so that the adhesive side 54 of the first flap 75 adheres to the print surface 82 of the second section 56. In this manner, the flaps 75, 76 laminate and protect the print surfaces 81, 82 of the label 10 and allow any printed matter thereon to be easily read through the flaps 75, 76. The order in which the flaps 75, 76 fold over the label sections 55, 56 is arbitrary.

A self-laminating barbell jewelry tag is described above as having flaps that extend from the edge of corresponding label sections at either end of a shank and that fold so as to laminate opposite label sections. In another embodiment, a singe flap extends from an end of one label section, which folds so as to laminate a second label section, in a manner similar to the rat tail embodiment described above. In yet another embodiment, a double-wide laminating flap extends from an edge of a first label section and folds twice so as to laminate a second label section and then the first label section, wrapping entirely around both sections.

Jewelry Tag Substrate

Figure 9B:
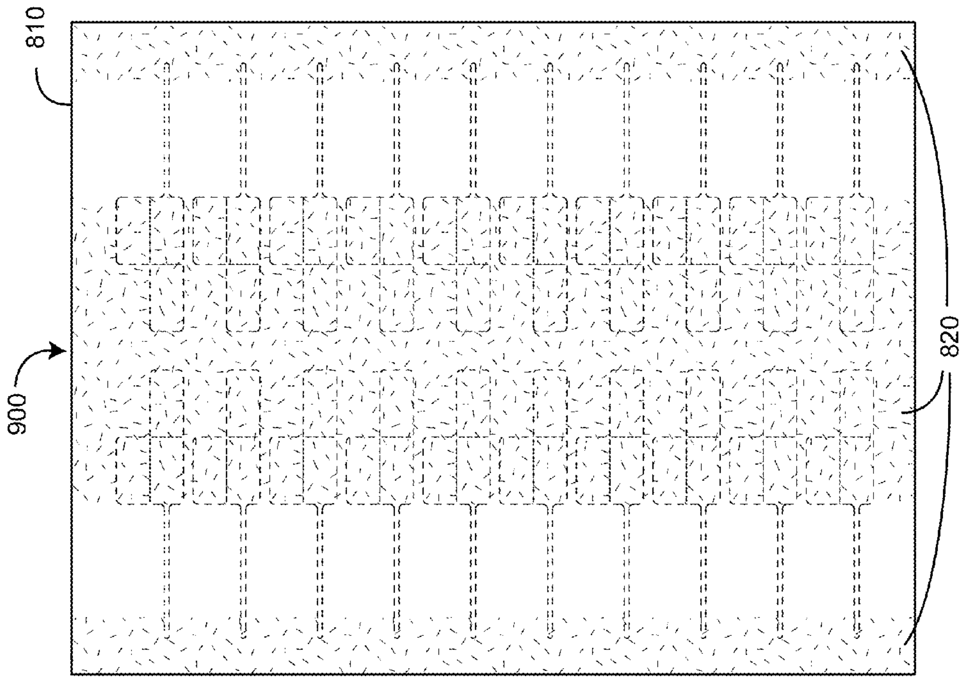
FIGS. 9A-B are plan views of a sheet substrate containing multiple jewelry tags.
Figure 9A:
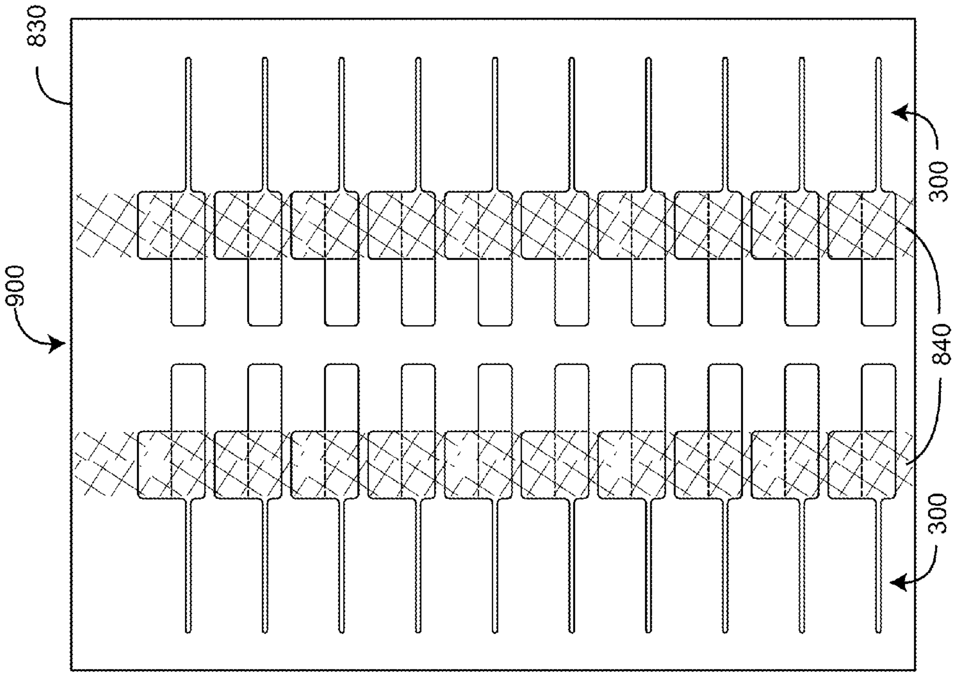
Figure 10B:
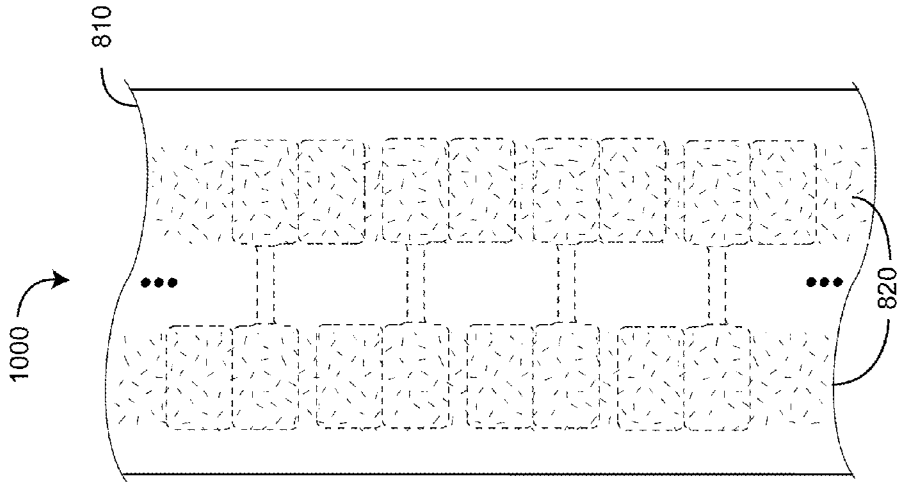
FIGS. 10A-B are plan views of a roll substrate containing multiple jewelry tags.
Figure 10A:
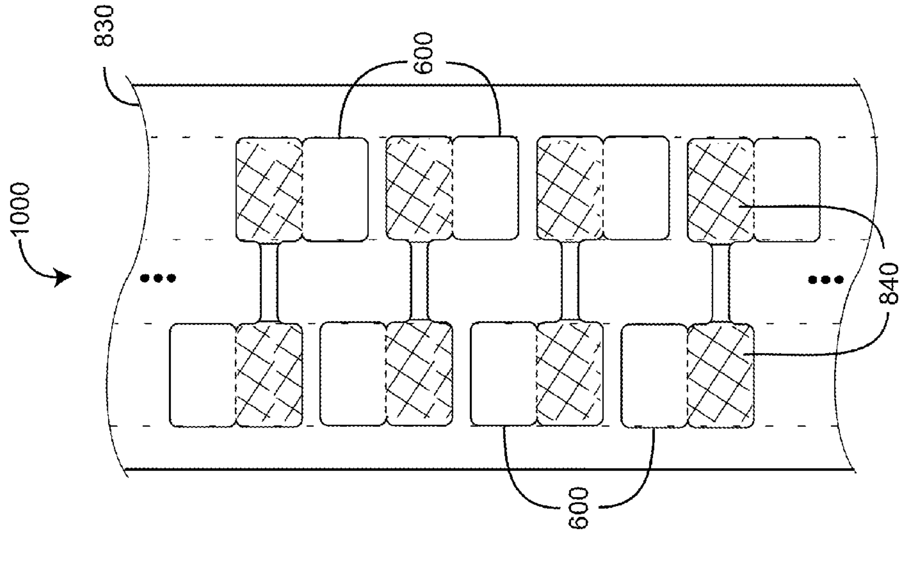

FIGS. 8-10 illustrate jewelry tag substrate embodiments (800-1000) adapted to be die cut or to otherwise define multiple jewelry tags 100-600 (FIGS. 1-7), such as described above. As shown in FIG. 8, a jewelry tag substrate 800 embodiment is a lamination of four layers including a release liner 810, an adhesive 820, a face stock 830 and a top coat 840. The release liner 820 is adapted so that the adhesive 820 adheres to removed portions of the face stock 830 and not the liner 820, as is also well-known in the art. The adhesive 820 may be sprayed on, rolled on or otherwise applied to either the release liner 810 or the face stock 830, as is well-known in the art. In one embodiment, the adhesive 820 is applied in zones, such as continuous strips, so as to define adhesive free portions across multiple jewelry labels, such as described with respect to FIGS. 9-10, below. As described below, the substrate 800 may be a printable sheet 900 (FIG. 9A) or printable roll 1000 (FIG. 10A).

Also shown in FIG. 8, the face stock 830 is adapted to provide a flexible base material for jewelry tags 100-600 (FIGS. 1-7). In one embodiment, the face stock 830 is a substantially clear film, such as polyethylene, polypropylene or polyester to name a few. The film may have a tint that is substantially transparent. In one embodiment, the face stock 830 is printable and a top coat 840 is not used. In another embodiment, the top coat 840 provides a print surface for a jewelry label 10, 50 (FIGS. 1-7). For example, the top coat 840 may be an ink that is waterproof or temperature sensitive or otherwise adapted to any of various print processes such as laser, ink jet or thermal printing. The top coat 840 may range from clear to substantially opaque and may be colorless or white, silver, blue or various other colors. The top coat layer 840 may be sprayed on, rolled on, pressed on or otherwise applied in zones across the film layer 830 so as to correspond to jewelry tag print surfaces. In a particular embodiment, the face stock 830 is a 2 mil polyester film and the adhesive 820 is a permanent acrylic.

Printable Sheet

As shown in FIGS. 9A-B, a printable sheet substrate 900 has a release liner 810, an adhesive 820, a face stock 830 and a top coat 840, as described above. As shown in FIG. 9A, multiple self-laminating rat tail jewelry tags 300 are die cut "2-up" in the face stock 830. A top coat 840 is applied to the face stock 830 in continuous strips over the tag labels 10 (FIG. 3) but leaving the shanks 20 (FIG. 3) and flaps 30 (FIG. 3) uncoated. As shown in FIG. 9B, a zone adhesive 820 is applied to the release liner 810 in continuous strips on the adhesive side 14 (FIG. 4A) of the tags 300 (shown dashed on the release liner 810 for reference) so as to cover the labels 10 (FIG. 3), shank tip 22 (FIG. 3) and flaps 30 (FIG. 3) but leaving the shank 20 (FIG. 3) adhesive free. The printable sheet substrate 900 is adapted to print in a sheet-fed printer, such as a conventional laser printer.

Printable Roll

As shown in FIGS. 10A-B, a printable roll substrate 1000 has a release liner 810, an adhesive 820, a face stock 830 and a top coat 840, as described above. As shown in FIG. 10A, multiple self-laminating barbell jewelry tags 600 are die cut "1-up" in the face stock 830. A top coat 840 is applied to the face stock 830 in regularly intermittent strips over the tag labels 50 (FIG. 6) so as to leave the shanks 60 (FIG. 6) and flaps 70 (FIG. 6) uncoated. As shown in FIG. 10B, a zone adhesive 820 is applied to the release liner 810 in continuous strips on the adhesive side 54 (FIG. 7A) of the tags 600 (shown dashed on the release liner 810 for reference) so as to cover the labels 50 (FIG. 6) and flaps 70 (FIG. 6) but leaving the shank 60 (FIG. 6) adhesive free.

A self-laminating jewelry tag has been disclosed in detail in connection with various embodiments. These embodiments are disclosed by way of examples only and are not to limit the scope of the claims that follow. One of ordinary skill in art will appreciate many variations and modifications.

What is claimed is:

1. A self-laminating jewelry tag has a clear flap which folds over a label printable side so that a clear flap adhesive side substantially covers and adheres to the label printable side, thereby laminating and protecting printing on the label printable side from wear, cleaning or other processes that tend to render the printing illegible, the self-laminating jewelry tag comprising:

a label having a label printable side and a label adhesive side;

a flap extending from the label, the flap being substantially clear;

the flap having a flap adhesive side and a flap non-adhesive side;

adhesive on the flap adhesive side substantially covering the flap adhesive side;

the flap foldable over the label so that the flap adhesive side contacts and adheres to the label printable side, laminating the label printable side so as to protect printing on the label printable side;

a first section and a second section comprising the label;

the flap extending from at least one of the sections;

the sections foldable together so that the label printable side forms opposite facing print surfaces;

the flap foldable over at least one of the sections so as to laminate the at least one of the sections.

2. The jewelry tag according to claim 1 further comprising a flap fold line separating the flap from the label, allowing the flap to fold along the flap fold line and onto the label printable side.

3. The jewelry tag according to claim 2 further comprising:

an elongated shank extending from at least one of the sections;

the shank is bendable in a loop with the shank passing through jewelry and terminating at the folded sections so as to secure the label to jewelry.

4. The jewelry tag according to claim 3 further comprising:

a flap comprising a first flap portion and a second flap portion;

the first flap portion extending from the first section;

the second flap portion extending from the second section; and the sections attachable together in a clamshell fashion.

5. The jewelry tag according to claim 4 further comprising:

a first flap fold line defining the first flap portion; and a second flap fold line defining the second flap portion.

6. The jewelry tag according to claim 5 wherein:

the first flap portion is foldable along the first flap fold line so as to laminate the second section; and the second flap portion is foldable along the second flap fold line so as to laminate the first section.

7. The jewelry tag according to claim 6 wherein:

the shank extends between the first section and the second section;

the first flap portion extends from the first section in a first direction generally perpendicular to the elongated shank;

the second flap portion extends from the second section in a second direction generally perpendicular to the elongated shank and generally opposite the first direction.

* * * * *